United States Patent [19]

Röhling et al.

[11] Patent Number: 5,767,451
[45] Date of Patent: Jun. 16, 1998

[54] INSULATING SUPPORT FOR VACUUM SWITCH TUBES

[75] Inventors: Christoph Röhling; Claudia Sigusch, both of Berlin; Norbert Steinemer, Falkensee, all of Germany

[73] Assignee: Siemens Aktiengesellschaft, Munich, Germany

[21] Appl. No.: 737,967
[22] PCT Filed: May 29, 1995
[86] PCT No.: PCT/DE95/00708
§ 371 Date: Feb. 18, 1997
§ 102(e) Date: Feb. 18, 1997
[87] PCT Pub. No.: WO95/33272
PCT Pub. Date: Dec. 7, 1995

[30] Foreign Application Priority Data

May 30, 1994 [DE] Germany .................. 9409006 U

[51] Int. Cl.⁶ ............................................. H01B 17/00
[52] U.S. Cl. ................................. 174/158 R; 218/134
[58] Field of Search ............................. 174/158 R, 161 R, 174/135, 152 G, 163 R; 218/134, 139, 140, 141, 153, 155

[56] References Cited

U.S. PATENT DOCUMENTS 3,663,906  5/1972  Barkan et al. ............................ 335/195
3,921,109  11/1975  Hodgson ................................. 335/195
4,247,745  1/1981  Wilson ................................ 200/144 B
5,528,009  6/1996  Marquardt et al. ...................... 218/140

FOREIGN PATENT DOCUMENTS 0 564 057 A1  10/1993  European Pat. Off. .
33 23 861  1/1985  Germany .
42 11 154 A1  10/1993  Germany .
U 94 09 006  9/1994  Germany .
WO 93/20571  10/1993  WIPO .

Primary Examiner—Kristine L. Kincaid
Assistant Examiner—Dhiru R. Patel
Attorney, Agent, or Firm—Kenyon & Kenyon

[57] ABSTRACT

An insulating support is provided for vacuum switch tubes with actuator units to be used in switchgears, in particular in gas-filled units. The insulating support has a flatbed-type extruded plastic piece with a profile fitting around the periphery of the actuator unit of the vacuum switch tubes, with the ends of the insulating support being provided with attachment arms extending in opposite directions and containing screw beds arranged symmetrically in relation to the longitudinal axis. Such insulating supports are used for accommodating and securing vacuum switch tubes equipped with actuator units for switchgears.

4 Claims, 1 Drawing Sheet

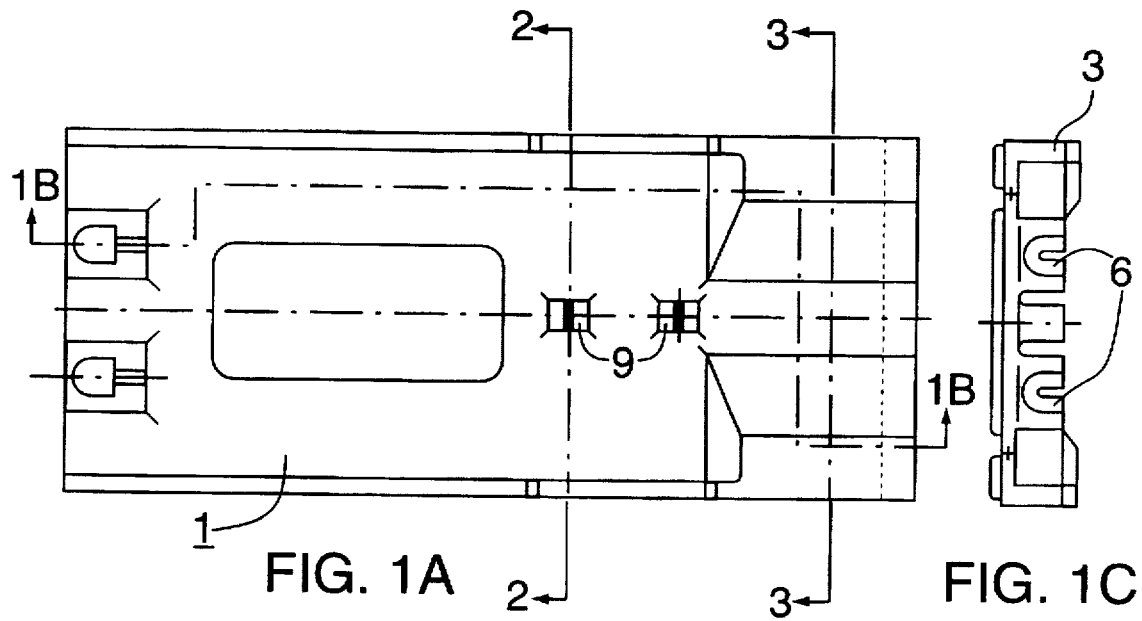
FIG. 1A
FIG. 1C
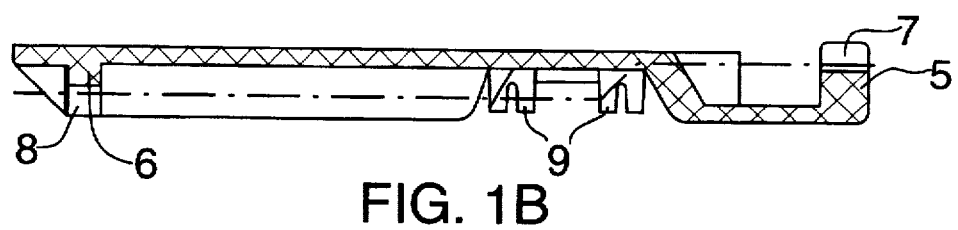
FIG. 1B
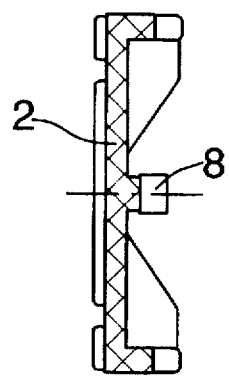
FIG. 2
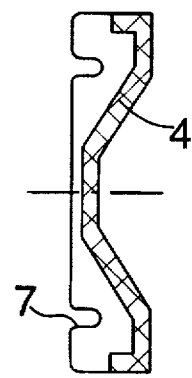
FIG. 3

INSULATING SUPPORT FOR VACUUM SWITCH TUBES

FIELD OF THE INVENTION

The present invention relates to insulating supports for vacuum switch tubes with actuator units to be used in switchgears, in particular in gas-filled units.

BACKGROUND OF THE INVENTION

As known from German Patent 4,211,154, vacuum switch tubes were previously arranged between upper and lower insulating plates directly fastened, by means of fasteners, on the front and rear walls of the container located in the switchgear. The design of the insulating supports is thus directly dependent on the geometry of the container. Even small geometric changes result in immediate adaptive changes of the insulating supports and/or their fasteners.

OBJECTS AND SUMMARY OF THE INVENTION

The basic object of the present invention is to design the arrangement of the vacuum switch tubes so that adaptive design changes are avoided whenever possible and, in particular, the assembly and installation of the vacuum switch tubes into the containers is considerably simplified.

According to the invention, this is achieved by an insulating support having the following features:

1.1 the insulating support comprises a flatbed-type extruded plastic piece with an approximately perpendicular longitudinal side, 1.2 the flatbed-type extruded plastic piece has, at a first end, which can be removably connected to the switchgear, an enclosing profile crimped inward in relation to the longitudinal plane and fitting around the periphery of an actuator unit of the vacuum switch tubes, bordered by a first attachment arm that is perpendicular to the longitudinal plane, 1.3 the flatbed-type extruded plastic piece has, at a second end, which can be removably connected to a radial support of the vacuum switch tubes, a second attachment arm extending in the opposite direction to that of the first attachment arm, which arm borders on the flatbed-type extruded plastic piece in the central longitudinal area of the insulating support, 1.4 the first attachment arm has two first screw beds arranged symmetrically in relation to a longitudinal axis, and the second attachment arm has two additional screw beds arranged symmetrically in relation to a longitudinal axis, and 1.5 the insulating support has, in its inner area, two second screw beds arranged next to one another on the longitudinal axis.

With the flatbed-type extruded plastic piece having a generally perpendicularly extending longitudinal side, a gap is formed by two insulating supports mounted symmetrically opposite one another; radial and contact supports can be arranged in said gap for the vacuum switch tubes. Both insulating supports are firmly attached to the container or a part thereof with their first attachment arms over the first screw beds, while the second attachment arm with the additional screw beds serves to accommodate a radial support of the vacuum switch tubes. With this arrangement of the vacuum switch tubes between the insulating supports mounted symmetrically opposite one another, the result is that their arrangement within the container is largely independent of the geometry thereof. The design of the insulating supports can also be used with the most varied container designs without requiring constant adaptations to the container geometry.

According to an advantageous embodiment of the invention, the surrounding piece has a trapezoidal shape. The insulating support is given a high degree of rigidity by the trapezoidal design of the surrounding piece.

Another advantageous embodiment of the invention provides for the implementation of the first and second screw beds of the insulating support with stops each semi-surrounding a bolt barrel so that both the assembly with the container and the installation of the vacuum switch tube supports are facilitated. Manufacturing dimensional tolerances can be compensated for with appropriate position corrections of the vacuum switch tubes using the stops.

BRIEF DESCRIPTION OF THE DRAWINGS

FIG. 1 is a top plan view of an insulating support in accordance with the invention.

FIG. 1B is a cross-section view of the insulating support taken along lines D—D of FIG. 1A.

FIG. 1C a front view of the insulating support.

FIG. 2 is a cross-section view of the insulating support taken along lines A—A of FIG. 1A.

FIG. 3 is a cross-section view of the insulating support taken along lines B—B of FIG. 1A.

DETAILED DESCRIPTION

FIGS. 1A–1C show insulating support 1 with its flatbed-type extruded plastic piece 2 (FIG. 2). The flatbed-type extruded plastic piece 2 is provided with a generally perpendicularly extending longitudinal boundary side 3, which provides the insulating support 1 with a particularly high dimensional stability. The plastic extruded piece 2 has, in the plane B—B illustrated, an inwardly crimped profile 4 fitting around the periphery of an actuator unit A; this profile has a trapezoidal shape, as shown in FIG. 3.

Furthermore, insulating support 1 contains, in addition to first attachment arms 5, two first screw beds 7 arranged symmetrically in relation to the longitudinal axis on a first end FE. The first screw beds 7 serve for attaching the insulating support to the outer periphery of a container (not illustrated). Furthermore, insulating support 1 is provided with second attachment arm 6, extending in a direction opposite that of the first attachment arms 5 on a second end SE which also has two additional screw beds 8 arranged symmetrically in relation to the longitudinal axis. These screw beds 8 serve for the attachment of a radial support (not illustrated) for the vacuum switch V tubes mounted between the two symmetrically mounted insulating supports 1. It can also be seen that insulating support 1 has, on the inside, two second screw beds 9 arranged next to one another along a longitudinal axis, which are arranged shifted at a right angle in relation to the additional screw beds 8 (FIG. 2). These second screw beds 9 are used to accommodate the support of the vacuum switch tubes between insulating supports 1.

We claim:

1. An insulating support for a vacuum switch tube with an actuator unit to be used in a switchgear in gas-filled units, comprising:

A flatbed-type extruded plastic member with a substantially perpendicular longitudinal side, said flatbed-type extruded plastic member having a first end removably connectable to the switchgear, and having at said first end an enclosing profile crimped inward with respect to a longitudinal plane of said plastic member and adapted to be fitted around a periphery of the actuator unit of the vacuum switch tube, said first end being bordered by a first attachment arm extending perpendicular to the longitudinal plane, said flatbed-type extruded plastic member having a second end removably connectable to a radial support of the vacuum switch tube, and having at said second end a second attachment arm extending in a direction opposite to that of the first attachment arm, said second attachment arm bordering the flatbed-type extruded plastic member in a central longitudinal area of the insulating support, said first attachment arm having two first screw beds arranged symmetrically with respect to a longitudinal axis of said plastic member, and the second attachment arm having two additional screw beds arranged symmetrically with respect to the longitudinal axis, said insulating support having at an inner area thereof two second screw beds arranged next to one another along the longitudinal axis.

2. The insulating support of claim 1, wherein said enclosing profile has a trapezoidal shape.

3. The insulating support of claim 2, further comprising third screw beds provided as stops in the insulating support, each said third screw bed semi-surrounding a bolt barrel.

4. The insulating support of claim 1, further comprising third screw beds provided as stops in the insulating support, each said third screw bed semi-surrounding a bolt barrel.

* * * * *